United States Patent
Lee et al.

(10) Patent No.: US 6,928,551 B1
(45) Date of Patent: Aug. 9, 2005

(54) METHOD AND APPARATUS FOR SELECTIVELY DENYING ACCESS TO ENCODED DATA

(75) Inventors: Larry A. Lee, Vestal, NY (US); Robert L. Kilmer, Jr., Endicott, NY (US); David R. Menigoz, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 858 days.

(21) Appl. No.: 09/697,304

(22) Filed: Oct. 27, 2000

Related U.S. Application Data

(60) Provisional application No. 60/162,404, filed on Oct. 29, 1999.

(51) Int. Cl.[7] .................................. H04L 9/00
(52) U.S. Cl. ................... 713/200; 380/50; 380/52; 380/273; 380/278; 380/283; 380/286; 713/185; 713/193; 713/200; 713/201
(58) Field of Search ............... 713/200, 201, 713/185; 380/286, 52, 278, 283, 273, 50

(56) References Cited

U.S. PATENT DOCUMENTS

| | | | |
|---|---|---|---|
| 4,817,140 A | | 3/1989 | Chandra et al. |
| 5,457,748 A | * | 10/1995 | Bergum et al. ............ 380/270 |
| 5,513,260 A | | 4/1996 | Ryan |
| 5,563,947 A | | 10/1996 | Kikinis |
| 5,596,639 A | | 1/1997 | Kikinis |
| 5,610,981 A | * | 3/1997 | Mooney et al. ............ 713/185 |
| 5,677,952 A | | 10/1997 | Blakley, III et al. |
| 5,754,648 A | | 5/1998 | Ryan et al. |
| 5,754,649 A | | 5/1998 | Ryan et al. |
| 5,815,577 A | * | 9/1998 | Clark ........................ 380/52 |
| 5,870,468 A | | 2/1999 | Harrison |
| 6,314,409 B2 | * | 11/2001 | Schneck et al. ............ 705/54 |
| 6,351,813 B1 | * | 2/2002 | Mooney et al. ............ 713/185 |

OTHER PUBLICATIONS

Mallet, P.W.; "Considerations for Applying Disk Encryptors to Environments Subject to Hostile Overrun"; Computer Security Applications Conference, 1991. Proceedings., Seventh Annual, Dec. 2-6, 1991 IEEE; pp.: 218-222.*

* cited by examiner

*Primary Examiner*—Ayaz Sheikh
*Assistant Examiner*—Carl Colin
(74) *Attorney, Agent, or Firm*—Whitham, Curtis & Christofferson P.C.

(57) ABSTRACT

A method and system is provided for selectively denying access to encoded data. Encryption is used to protect secured data on any of a number of media devices in a system and in which unsecured data is not encrypted. The classified data is encrypted and then transmitted for storage on the medium. The encryption key is stored only in volatile memory on the target device connected to the medium during a mission. The encryption key is known only in a location physically distant from the target device during a mission. Resources are provided for mission personnel to immediately delete the encryption key from volatile memory upon perceiving a threat, as well as causing automatic deletion of the encryption key upon a power loss to the target device in order to make the encrypted data unavailable to any personnel (whether authorized or not) at the location of the target device.

11 Claims, 2 Drawing Sheets

METHOD AND APPARATUS FOR SELECTIVELY DENYING ACCESS TO ENCODED DATA

CROSS-REFERENCE TO RELATED APPLICATION

This application claims priority to Provisional Patent Application Ser. No. 60/162,404 entitled "Method and Apparatus for Selectively Denying Access to Encoded Data" filed by L. A. Lee, R. Kilmer and D. R. Menigoz on Oct. 29, 1999, the entire subject matter of which is incorporated herein by reference.

GOVERNMENT LICENSE RIGHTS

The U.S. Government has a paid-up license in this invention and the right in limited circumstances to require the patent owner to license others on reasonable terms as provided for by the terms of Contract No. N00019-93-C-0196 awarded by the Department of the Navy.

BACKGROUND OF THE INVENTION

1. Field of the Invention

The present invention relates to a method and apparatus capable of reading, storing and writing encrypted and non-encrypted data and for selectively denying the ability to access data secured through encryption.

2. Background Description

The present invention generally relates to the use of computers which are mobile and which may become involved in a scenario in which an adversary will seek to take possession of the computer and read the secured data. The data is normally made secure due to its being classified in accordance with security regulations. An example of when the present invention may be used is in the field of military helicopters. A specific example is the LAMPS Block 11 helicopter. In this example, the helicopter includes two removable, rugged commercial mass memory devices. These devices communicate, via a small computer system interface (SCSI) bus, with a mission computer (MC) and a flight management computer (FMC). One mass memory device is an extended mass storage unit (EMSU) disk drive, and the other is a dual PCMCIA (Personal Computer Memory Card International Association) card reader data transfer system (DTS) which uses flash memory cards. The EMSU and each of the flash memory cards appear to the computers as disks. Different sets of data on the disks may be classified or unclassified. The other flash memory card generally contains only unclassified data. In the event of a helicopter finding itself in jeopardy, it is desirable to render the classified data unreadable, whether by removal, erasure or otherwise. For national security purposes, the U.S. government desires at least one new helicopter designed with the ability to render the classified data unreadable within ten minutes.

Currently, classified matter is erased from EMSU devices in accordance with United States Navy Remanence Security Guidebook, NAVSO-5329-26, September 1993, Navy Stock number 0515-LP-208-8345. "Remanence" refers to residual information remaining on data storage media after insufficient purging procedures. Chapter 3 of this Guidebook defines acceptable methods for overwriting magnetic media and for purging magnetic storage media for degaussing. While such methods will indeed render the disk memory unusable, due to the size of the EMSU, these methods cannot be performed in ten minutes. There is also no presently approved method for overwriting data on DTS flash memory cards.

The erasure methods also do not distinguish between classified and unclassified data. Previous military solutions have been hardware based solutions in which all of the data written to a disk had to be encrypted because hardware encryptors don't distinguish between classified and unclassified files. Previous commercial encryption efforts have used both hardware and software based approaches, again using bulk encryptions. Software encryption solutions are typically not intended for real time applications.

Classified government data is not the only type of data that one might wish to safeguard. There are systems in the prior art designed to prevent an unauthorized person from accessing data on a portable, or laptop, computer.

For instance, in U.S. Pat. Ser. No. 5,677,952 to Blakely, III et al., there is taught a method, using a secret key, to protect information in a storage disk of a computer using encryption/decryption, where the secret key is derived from a password entered into the computer by an authorized user. The Blakely III et al. method teaches that the secret key is erased from volatile memory when the computer is powered off, logs off, or is inactive for a specified amount of time. Although the key is erased from volatile memory at power off, at least one user has knowledge of the password and can independently re-enable the key on power up, allowing the information to be decrypted. Thus, the key could be coerced from the user by traditional, albeit potentially ruthless methods. Also, Blakely III, et al. teach that a user must be entrusted with the password because the key is removed from volatile memory after the system has been inactive for a period of time, even when there is no threat of data loss.

U.S. Pat. Ser. No. 5,870,468 to Harrison teaches a method and an apparatus for protecting selected files in a portable computer system. With this invention a user selects a set of files on a hard disk of the system for protection. This invention uses an encryption key, a secret key and an algorithmic transform to protect the selected files. With this invention the selected files are encrypted with the encryption key, and two copies of the encryption key are scrambled, one with the secret key and one with the transform of the secret key. Then, both scrambled versions of the encryption key are stored on the hard disk. When the user enters the secret key, the two scrambled versions of the encryption key are unscrambled using the key entered by the user and by using the transform of the key entered by the user. These unscrambled versions are then compared. If these unscrambled versions match, the original encryption key has been correctly restored and selected files will be decrypted either immediately or when referenced by an application program. This invention also calls for re-encrypting the selected files upon expiration of a timer indicating that the computer is idle or upon the repeated failure of a user to enter the secret key when requested.

In short, Harrison teaches having the user enter a password to generate the encryption key. When the password is successfully entered and the key recovered, the files on the disk will be decrypted and when an inactivity timeout is reached that these files will be re-encrypted and stored on the disk. Thus, according to Harrison's invention, at any given point in time unencrypted files might be resident on a non-volatile disk.

U.S. Pat. Ser. No. 4,817,140 to Chandra et al. teach placing encrypted and (optionally) unencrypted files on the same media. They also teach placing the encryption key on the media with the data and removing that key. The encryption key is itself encrypted and there is a token cartridge that relies on a destructive read to remove the key whenever the key is read from the cartridge. In the Chandra et al. invention, access to the encryption key is controlled by a physically secure token being presented to a coprocessor, therefore requiring additional hardware component complexity in the system.

SUMMARY OF THE INVENTION

It is therefore an object of the present invention to provide a method and apparatus for quickly rendering selected data unavailable from a computer memory.

It is also an object of the present invention to provide a method and apparatus of the type described in one form to declassify computer disk drives in a timely manner to protect sensitive data from being accessed by unauthorized persons.

It is another object of the present invention to provide a method and apparatus of the type described capable of rendering data inaccessible whether the data is on a disk, flash memory card or other medium.

It is also an object of the present invention to provide a method and apparatus of the type described which provides for maintaining unsecured data while destroying access to secured data.

It is an additional object of the present invention to provide a method and apparatus of the type described in which operational files needed for guiding a helicopter, or other vehicle, home are maintained if the threat is removed after the selective destruction of secured data.

It is a further object of the present invention to provide a method and apparatus of the type described in which a key to encrypted data is maintained only in volatile form so that access to secured data is destroyed when a Mission Computer loses power.

It is a further object of the present invention to provide for the protection of data whereby the user of that data has no knowledge of the encryption key. Thus, the encryption key cannot be compromised by the user.

It is a further object of the present invention in one form to provide, a method and apparatus of the type described allowing increased access by uncleared (unauthorized) personnel for maintenance or other purposes due to access data from a separate medium containing only unsecured data.

Briefly stated, in accordance with the present invention, there are provided a method and means in a system in which removable disks, flash memory cards or other media interact with a computer via a bus in which encryption is used to protect secured data on any of a number of disks in a system and in which unsecured data is not encrypted. Encryption is done by adding an encryption extension to a bus driver, preferably for a SCSI bus. Classified data is determined to be in need of encryption before being stored in a medium. The classified data is delivered to means for encryption and then transmitted to an SCSI device driver for storage on the medium. Unclassified data is treated as not needing encryption and bypasses the encryption extension and goes straight to the SCSI driver. On read operations, non-encrypted data goes directly to the application calling for it.

To set up the system for selective, rapid destruction of secured data, a method and apparatus are provided to be used in a mission planning workstation at a helicopter base, which may be a ship. This workstation is in a secure area. A key of the day, which is an encryption key normally having a length on the order of a few hundred bits, is loaded into the mission planning workstation. This key is used to encrypt any classified mission files, and these files are loaded onto the DTS or EMSU. Unclassified files are loaded also. The encryption key is loaded into the EMSU. An operator carries the loaded memory media from the mission planning station and plugs the EMSU and DTS into respective slots on the aircraft for interface for the mission computer (MC). At helicopter power on, the MC loads the unclassified files, and uses the encryption key to read encrypted files. When the helicopter gets airborne, this causes the operational flight program (OFP) operating in the MC to erase the key from the EMSU. Thereafter, the key is maintained only in volatile memory. When a need to destroy access to the secured data arises, the operator activates a "zeroize" button, or other similar means, to erase the key. The method provided to erase the key is in accordance with the "Remanence Security Guidebook: Module 26 Information Systems Security (Infosec) Program Guidelines" (NAVSO P-5239-26 September 1993), herein incorporated by reference (hereinafter referred to as "NAVSO P-5239-26"). Since the size of the key is on the order of a few hundred bits, the key is erased or destroyed in a time span normally on the order of under a second. Should the helicopter crash, the encryption key will be lost when the power to the mission computer is removed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
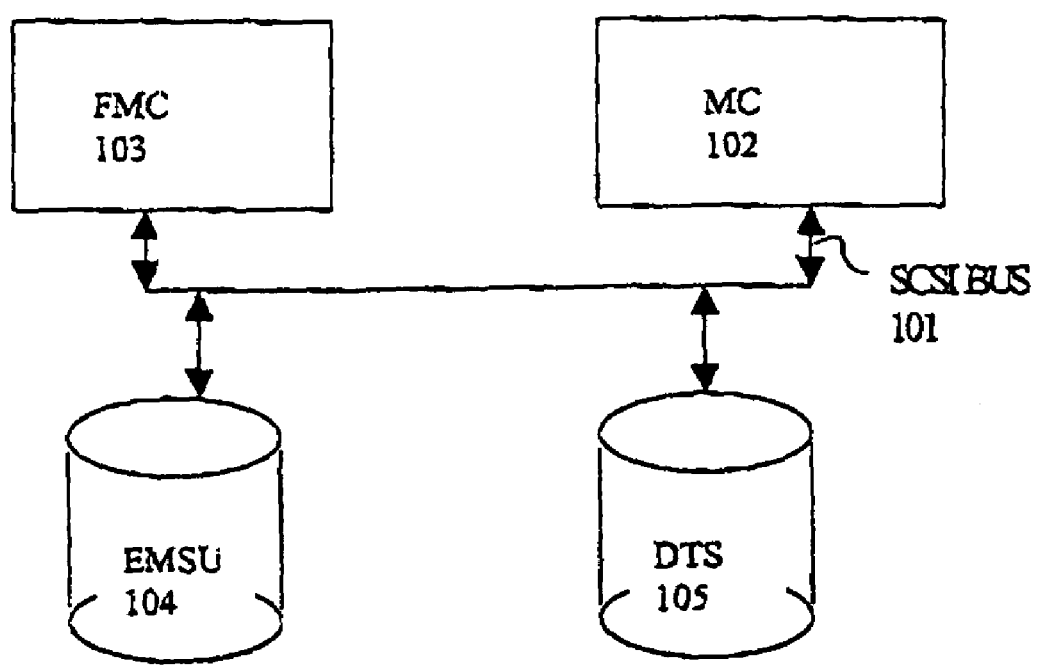
FIG. 1 is a high level diagram showing a means for denying access to data according to the present invention.

Referring now to the drawings, and more particularly to FIG. 1, there is shown a high level diagram showing a means for denying access to data according to the present invention. In the preferred embodiment of the present invention a helicopter includes two removable, rugged commercial mass memory devices. These devices communicate, via small computer system interface (SCSI) bus 101, with a mission computer (MC) 102 and a flight management computer (FMC) 103. The FMC typically performs flight related and unclassified tasks; however, in the preferred embodiment the FMC may be reconfigured to perform some of the tasks normally performed by the MC. The MC typically performs mission-specific tasks which by their nature are often classified. One mass memory device is a disk drive (EMSU) 104, and the other is a dual PCMCIA card reader (DTS) 105 which uses flash memory cards. The EMSU 104 and each of the flash memory cards appear to the computers as disks, with the EMSU and one flash memory card each containing a large amount of data. Different sets of data may be classified or unclassified. The other flash memory card generally contains only unclassified data. It would be apparent to one skilled in the art that various media type may be used and the present invention is not limited to EMSU and DTS devices.

In the preferred embodiment, the encryption function in the MC is performed by an encrypting SCSI device driver in the operating system. This device driver either passes the SCSI data through untouched or applies encryption or decryption to the data as needed. Encrypted data on the EMSU or DTS is identified by an encryption flag in the file header. If the flag is present for data read from the DTS or EMSU, then the data needs need to be decrypted and is routed through the decryption algorithm before being handed to the calling application. If no flag is present, then the data is unclassified plain text and is passed straight to the calling application. Classified data to be written to a storage medium 104 or 105 is delivered to the encrypting SCSI device driver in the MC where it is encrypted and transferred to either the EMSU 104 or the DTS 105. It would be apparent to one skilled in the art that various algorithms for encryption may be used, and that a hardware encryptor/decryptor could be substituted for the SCSI device driver. A substitute algorithm would be selected by weighing factors related to ease of use/integration, robustness, and the algorithm's inherent ability to withstand cracking; thus, the present invention is not limited to any one encryption/decryption algorithm or limited only to software implementation.

Systems of the prior art cannot provide the immediate declassification or denial of data required in a military or other sensitive operation. As described above, systems have been designed that can selectively store both classified and unclassified data. Systems have also been developed that will automatically destroy a decryption key upon power off and passing a threshold of idle time. None of these systems can guarantee all of the following:

a mission can continue when there is no actual threat, but the key is deleted in error, a mission can continue indefinitely when there is no threat, even though there is no operator input (technically idle), unauthorized personnel cannot gain access to any unencrypted classified/sensitive data on a captured device, and operators have no knowledge of the key.

For instance, the Blakely III, et al., supra, invention and the Harrison, supra, invention of the prior art teach systems where the user enters a password which either allows the encryption key to be derived or allows the encryption key to be descrambled. In either case, a person with access to the computing device has the ability to reload the encryption key. Therefore, a risk remains that the person with access could be coerced into revealing the password, thereby compromising the data.

Figure 2:
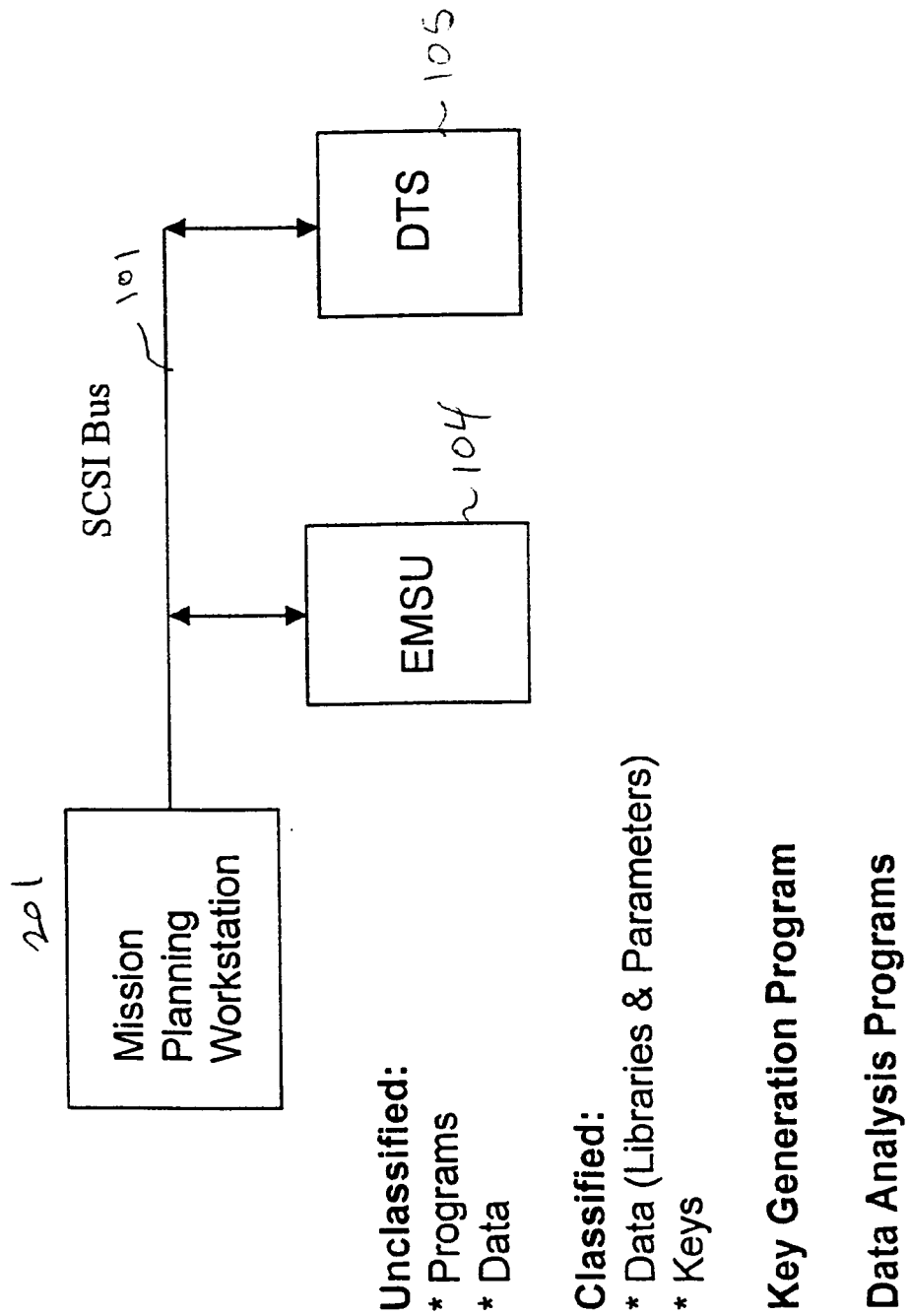
FIG. 2 is a diagram showing a connection from a mission planning workstation to a system containing a means for denying access to data.

Referring now to FIG. 2, there is shown an overview of the present invention including a mission planning workstation 201. The mission planning workstation is connected to the EMSU 104 and DTS 105 via a SCSI bus 101 prior to a mission. To set up the system for selective, rapid destruction of secured data, a mission planning workstation 201 is utilized at a helicopter base, which may be a ship. This workstation is in a secure area. A key of the day, which is an encryption key normally having a length on the order of a few hundred bits, is loaded into the mission planning workstation 201. This key is used to encrypt any classified mission files, and these files are loaded onto the DTS 105 or EMSU 104. Unclassified files are loaded also. The encryption key is loaded into the EMSU 104. An operator carries the loaded memory media and plugs the EMSU 104 and DTS 105 into respective slots on the aircraft for interface for the Mission Computer 102 (not shown). At helicopter power on, the MC loads the unclassified files, and uses the encryption key to read encrypted files. Encryption key erasure from the EMSU is triggered by the helicopter taking off on its mission. The Weight-on-Wheels switch in the helicopter is the indication that the aircraft has left the ground. Waiting until the aircraft has left the ground to erase the encryption key allows the possibility of powering up the aircraft for pre-flight checks and then powering down to perform repairs without having to reload the encryption key. Thereafter, the key is maintained only in volatile memory. One should note that at this point, the helicopter, or portable device, is still in friendly territory, and not at risk. It would be apparent to one skilled in the art that other actions could be used to trigger the erasure of the key from non-volatile memory or the key could be erased manually.

Additional safeguarding measures are also implemented. At power on, the aircraft operational program (AOP) loads and then looks for a key file. If present, the encrypted files are loaded and classified data can then be written onto the media. If the key file is not present, no encrypted files are loaded and no classified, or sensitive data is written. Further, when the key is erased from non-volatile memory, data is written over the physical key location any desired number of times. This data used can be any series of bits (e.g., all ones, all zeros, alternating ones and zeroes, random bits, etc.).

When the mission commences, the portable device, or helicopter, becomes physically distant from anyone or any machine that has the encryption key stored in memory (i.e., human or semi-conductor, bubble, etc.). This method provides the distinct advantage that the encryption key cannot be coerced from a human and entered into the portable system by unauthorized personnel. This method also requires no destructive reads, or additional steps to delete the key from non-volatile memory once the mission has commenced. Since the key is not stored in permanent or non-volatile memory, there is never a case when the system can be disabled at a time before the key is erased, once it has left the base area on a mission.

The present invention does not put unencrypted sensitive data in non-volatile storage. Thus, if the device is powered off there is no chance of any compromise of data. This solves a problem encountered with systems in the prior art as illustrated by the Harrison patent, supra. According to Harrison, after the user enters a password for descrambling the encryption key, necessary files are decrypted and written onto the hard drive for use. After a pre-specified period of idle time, the computing device will re-encrypt the files and rewrite the disk. This method may be sufficient to protect data when safeguarded by possession of a casual user, because a theft is not likely to take place while the device is in use (e.g., laptop used by a business person while waiting for an airplane). However, this method has serious risks and disadvantages in a combat or similar scenario. It is foreseeable that the device could be stolen, disabled or powered off while there is still unencrypted sensitive data on a non-volatile drive. The selection of the operating system used with this invention is important. The preferred embodiment uses a real time operating system which does not use a swap file. Thus, there is no chance that unencrypted classified data will ever be stored on the media (non-volatile memory) by accident.

When a need to destroy access to the secured data arises, the operator activates the "zeroize" button to erase the key in volatile memory. In the preferred embodiment, the method provided to erase the key is in accordance with NAVSO P-5239-26. Since the size of the key is on the order of a few hundred bits, the key is erased or destroyed in a time span normally on the order of under a second. Should the helicopter crash, the encryption key will be lost when the power to the mission computer is removed. Should the helicopter, or other portable device, be in danger of being boarded or stolen, the operator will almost assuredly have time to press the zeroize button to immediately erase the key from memory.

In the preferred embodiment of the invention, the helicopter is still capable of returning to the home base, even if the key is erased in error, or due to a perceived threat. Specifically, operational data required to fly the helicopter or maintain navigation is kept in unclassified, or unencrypted files. Thus, if the key is erased for any reason, the pilot can still fly the helicopter back to base, or continue with other segments of the mission, not requiring the encrypted data. Once the helicopter is safely back at base, the encrypted data can be unencrypted and loaded into memory again, as described above. Further, any data that was generated during the mission and encrypted on a media device can be retrieved once back at base, since the original encryption key is maintained on the mission planning workstation at the helicopter's home base.

The "limp home" capability is accomplished by ensuring that the minimum function to fly the aircraft is contained in unclassified (unencrypted) files on the EMSU or DTS. If, for example, there was a power glitch during the flight and the MC was power cycled, the encryption key would be lost. There would be no way to recover it while in flight. When the MC boots up, it looks for the encryption key on the EMSU but does not find it since it was erased shortly after take-off. The MC loads the unencrypted files which contain enough aircraft display, communication and navigation function to enable the crew to perform basic helicopter flight operations, but not to operate any of the equipment requiring classified data (i.e., the radar, ESM, or sonar). The preferred embodiment has a configure configuration with both FMC and MC computers, enabling data to be more easily segregated into classified mission data and unclassified flight data. Thus, if the classified data becomes unavailable due to erasure of the key, the vehicle can still perform the minimum flight operations required to get back to a home base, or predetermined end mission location. It would be apparent to one skilled in the art that a two computer configuration is not necessary and also that a configuration with more than two computers can also be implemented.

While the invention has been described in terms of its preferred embodiments, those skilled in the art will recognize that the invention can be practiced with modification within the spirit and scope of the appended claims.

What is claimed is:

1. A method for selectively denying access to encoded data, said method comprising the steps of:
   loading an encryption key into a mission planning workstation at a first location;
   connecting a media device to said mission planning workstation;
   loading said encryption key from said mission planning workstation into said media device;
   encrypting sensitive data using said encryption key;
   loading the encrypted data onto the media device;
   loading unencrypted data onto a media device, wherein data necessary to enable a target portable computing device associated with a vehicle to return to a location selected as a mission end location remains unencrypted;
   disconnecting said media device from the mission planning workstation;
   connecting a media device to the target portable computing device;
   powering up the target portable computing device, thereby enabling it to execute a desired program or process;
   transferring said encryption key to volatile memory from said media device;
   transporting the target portable computing device and media devices to a location physically distant from the mission planning workstation;
   deleting said encryption key from said media device in response to said transport step;
   maintaining said encryption key only in volatile memory after said deleting step; and
   deleting the encryption key from volatile memory resident on the target portable computing device responsive to an operator; or
   automatically deleting the encryption key from volatile memory resident on the target portable computing device in the event of a loss of power to the target portable computing device.

2. A method as recited in claim 1, wherein the step of deleting the encryption key responsive to an operator overwrites the location in non-volatile memory where the encryption key previously resided a desired number of times.

3. A method as recited in claim 1, wherein the step of deleting is triggered by an indication that a vehicle used for transporting the target portable computing device has left a home base.

4. A method as recited in claim 1, wherein the step of encrypting sensitive data further comprises the steps of:
   selecting an encryption key, wherein the encryption key comprises a number of bits sufficient to prohibit an unauthorized person from "breaking" the encryption key at a desired level of difficulty.

5. A method as recited in claim 4, wherein an operator of the target portable computing device has no knowledge of the encryption key used to encrypt data on the at least one media device in the encrypting step, and the encryption key is maintained at the home base mission planning workstation.

6. A method as recited in claim 4, wherein the step of selecting an encryption key selects a new key on a desired periodic basis, thereby minimizing a risk of compromise of a previously used encryption key.

7. A method as recited in claim 1, wherein said deleting step responsive to an operator is performed upon perceiving a threat by a member of the mission.

8. A method as recited in claim 7, further comprising the step of transporting the vehicle to the selected mission end location, wherein encrypted data remains encrypted and unencrypted data enables the vehicle to operate at with sufficient performance to arrive at the mission end location.

9. A method as recited in claim 1, further comprising the step of transporting the vehicle to the selected mission end location, wherein encrypted data remains encrypted and unencrypted data enables the vehicle to operate at with sufficient performance to arrive at the mission end location.

10. A system for selectively denying access to encoded data, comprising:
    a selected encryption key, the key being of a number of bits sufficient to deter compromise of sensitive data to a desired difficulty level;
    a target portable computing device loaded onto a land, sea, air or space vehicle, the target portable computing device used for mission specific tasks and having connections for at least one media device, wherein sensitive encrypted data and/or unencrypted benign data is to be loaded on the at least one media device depending on mission parameters, the target computing device comprising:
  means to delete the encryption key from volatile memory resident on the target portable computing device in the event of a threat, whether perceived or real responsive to an operator; and
  means to automatically delete the encryption key from volatile memory resident on the target portable computing device in the event of a loss of power to the target portable computing device;
a mission planning workstation connected to at least one media device during loading and encryption of sensitive data, and loading of unencrypted benign data, wherein the encryption key is loaded into the at least one media device and erased from said at least one media device after commencement of the mission,
wherein after sensitive data is encrypted on at least one media device connected to the mission planning workstation, each of the at least one media devices are connected to the target portable computing device and the encryption key is resident only in volatile memory on any media device connected to the target portable computing device after mission commencement, and
wherein sufficient unencrypted data resides on at least one media device connected to the target portable computing device to enable the mission vehicle to return to a selected mission end location in the event that the encryption key is deleted from volatile memory on the target portable computing device during the mission.

11. A system as recited in claim 10, further comprising:
means for communication between the mission planning computer and at least one media device and target portable computing device, wherein the at least one media device is connected simultaneously to both the mission planning workstation and the target portable computing device prior to mission commencement and during data encryption.

* * * * *